(12) United States Patent
Peachey (10) Patent No.: US 9,972,999 B2
(45) Date of Patent: May 15, 2018

(54) ELECTROSTATIC DISCHARGE (ESD) PROTECTION CIRCUIT

(71) Applicant: RF Micro Devices, Inc., Greensboro, NC (US)

(72) Inventor: Nathaniel Peachey, Oak Ridge, NC (US)

(73) Assignee: Qorvo US, Inc., Greensboro, NC (US)

(*) Notice: Subject to any disclaimer, the term of this patent is extended or adjusted under 35 U.S.C. 154(b) by 305 days.

(21) Appl. No.: 14/819,507

(22) Filed: Aug. 6, 2015

(65) Prior Publication Data

US 2016/0043542 A1 Feb. 11, 2016

Related U.S. Application Data

(60) Provisional application No. 62/034,958, filed on Aug. 8, 2014.

(51) Int. Cl.
*H02H 9/04* (2006.01)
*H02H 3/44* (2006.01)

(52) U.S. Cl.
CPC .............. *H02H 9/046* (2013.01); *H02H 3/44* (2013.01)

(58) Field of Classification Search
CPC ........... H02H 9/046; H02H 9/04; H02H 9/041
USPC .......................................................... 361/56
See application file for complete search history.

(56) References Cited

U.S. PATENT DOCUMENTS

| 5,301,084 A | * | 4/1994 | Miller | ............... H01L 27/0259 257/356 |
| 7,929,263 B1 | | 4/2011 | Peachey et al. | |

OTHER PUBLICATIONS

Smith, Jeremy C. et al., "A MOSFET Power Supply Clamp with Feedback Enhanced Triggereing for ESD Protection in Advanced CMOS Technologies," 2003 Electrical Overstress/Electrostatic Discharge Symposium (EOS/ESD '03), Sep. 21-25, 2003, IEEE, 9 pages.

* cited by examiner

*Primary Examiner* — Dharti Patel
(74) *Attorney, Agent, or Firm* — Withrow & Terranova, P.L.L.C.

(57) ABSTRACT

An electrostatic discharge (ESD) protection circuit is disclosed. In this regard, an ESD protection circuit is provided to protect an integrated circuit (IC) from an ESD event. In one aspect, an ESD voltage detection circuitry activates an ESD clamping circuitry when an ESD voltage associated with faster voltage rise time is detected between a supply rail and a ground rail. In another aspect, an operation voltage detection circuitry deactivates the ESD clamping circuitry when an operation voltage associated with slower voltage rise time is detected between the supply rail and the ground rail. By differentiating the ESD voltage from the operation voltage based on respective voltage rise times, it is possible to prevent the ESD clamping circuitry from missing the ESD voltage associated with the faster voltage rise time or being falsely activated by the operation voltage associated with the slower voltage rise time.

20 Claims, 7 Drawing Sheets

ELECTROSTATIC DISCHARGE (ESD) PROTECTION CIRCUIT

PRIORITY APPLICATION

This application claims priority to U.S. provisional patent application No. 62/034,958, filed Aug. 8, 2014, the disclosure of which is incorporated herein by reference in its entirety.

FIELD OF THE DISCLOSURE

The technology of the disclosure relates generally to protecting integrated circuits (ICs) during fabrication and production.

BACKGROUND

Mobile communication devices have become increasingly common in current society. The prevalence of these mobile communication devices is driven in part by the many functions that are now enabled on such devices. Demand for such functions increases the processing capability requirements for the mobile communication devices. As a result, increasingly complex integrated circuits (ICs) have been designed and manufactured to provide increasingly greater functionality in the mobile communication devices. Concurrent with the increases in complexity of the ICs, there has been pressure to decrease the footprint of the ICs as well.

It has become more challenging to increase yields and improve quality of the ICs during fabrication and production processes. As such, there is a growing interest in the effect of electrostatic discharge (ESD) during fabrication of the ICs, assembly of devices that use the ICs, and the operation of the ICs. ESD can be seen as a miniature lightning bolt of static charge between two surfaces that have different electrical potentials. Without proper protection, static charge movement associated with ESD may generate an electrical current high enough to damage or even destroy the passive and active devices, such as diodes and transistors, thus, rendering the ICs dysfunctional.

SUMMARY

Aspects disclosed in the detailed description include an electrostatic discharge (ESD) protection circuit. In this regard, an ESD protection circuit is provided to protect an integrated circuit (IC) from an ESD event. The ESD protection circuit comprises an ESD voltage detection circuitry and an operation voltage detection circuitry. In one aspect, the ESD voltage detection circuitry detects the ESD event in the IC when the ESD voltage detection circuitry detects a voltage spike having a faster voltage rise time between a supply rail and a ground rail. In response to detecting the ESD event, an ESD clamping circuitry is activated to discharge the ESD event, thus protecting the IC from being damaged by the ESD event. In another aspect, the operation voltage detection circuitry detects a normal IC power-up when the operation voltage detection circuitry detects an operation voltage having a slower voltage rise time between the supply rail and the ground rail. In response to detecting the operation voltage, the ESD clamping circuitry is deactivated to ensure normal IC operation. By differentiating an ESD voltage from the operation voltage based on respective voltage rise times, it is possible to prevent the ESD clamping circuitry from missing the ESD voltage associated with the faster voltage rise time or being falsely activated by the operation voltage associated with the slower voltage rise time.

In this regard, in one aspect, an ESD protection circuit in an IC is provided. The ESD protection circuit comprises an ESD clamping circuitry coupled between a supply rail and a ground rail and configured to discharge an ESD event in an IC. The ESD protection circuit also comprises first voltage detection circuitry coupled between the supply rail and the ground rail. The first voltage detection circuitry is configured to generate a first detection signal when an ESD voltage having a first rise time is detected between the supply rail and the ground rail. The ESD protection circuit also comprises second voltage detection circuitry coupled between the supply rail and the ground rail. The second voltage detection circuitry is configured to generate a second detection signal when an operation voltage that has a second rise time greater than fifty times the first rise time is detected between the supply rail and the ground rail. The ESD protection circuit also comprises latch circuitry coupled to the first voltage detection circuitry and the second voltage detection circuitry. The latch circuitry is configured to activate the ESD clamping circuitry to discharge the ESD event in response to the first detection signal. The latch circuitry is also configured to deactivate the ESD clamping circuitry in response to the second detection signal.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include an electrostatic discharge (ESD) protection circuit. In this regard, an ESD protection circuit is provided to protect an integrated circuit (IC) from an ESD event. The ESD protection circuit comprises an ESD voltage detection circuitry and an operation voltage detection circuitry. In one aspect, the ESD voltage detection circuitry detects the ESD event in the IC when the ESD voltage detection circuitry detects a voltage spike having a faster voltage rise time between a supply rail and a ground rail. In response to detecting the ESD event, an ESD clamping circuitry is activated to discharge the ESD event, thus protecting the IC from being damaged by the ESD event. In another aspect, the operation voltage detection circuitry detects a normal IC power-up when the operation voltage detection circuitry detects an operation voltage having a slower voltage rise time between the supply rail and the ground rail. In response to detecting the operation voltage, the ESD clamping circuitry is deactivated to ensure normal IC operation. By differentiating an ESD voltage from the operation voltage based on respective voltage rise times, it is possible to prevent the ESD clamping circuitry from missing the ESD voltage associated with the faster voltage rise time or being falsely activated by the operation voltage associated with the slower voltage rise time.

Figure 1:
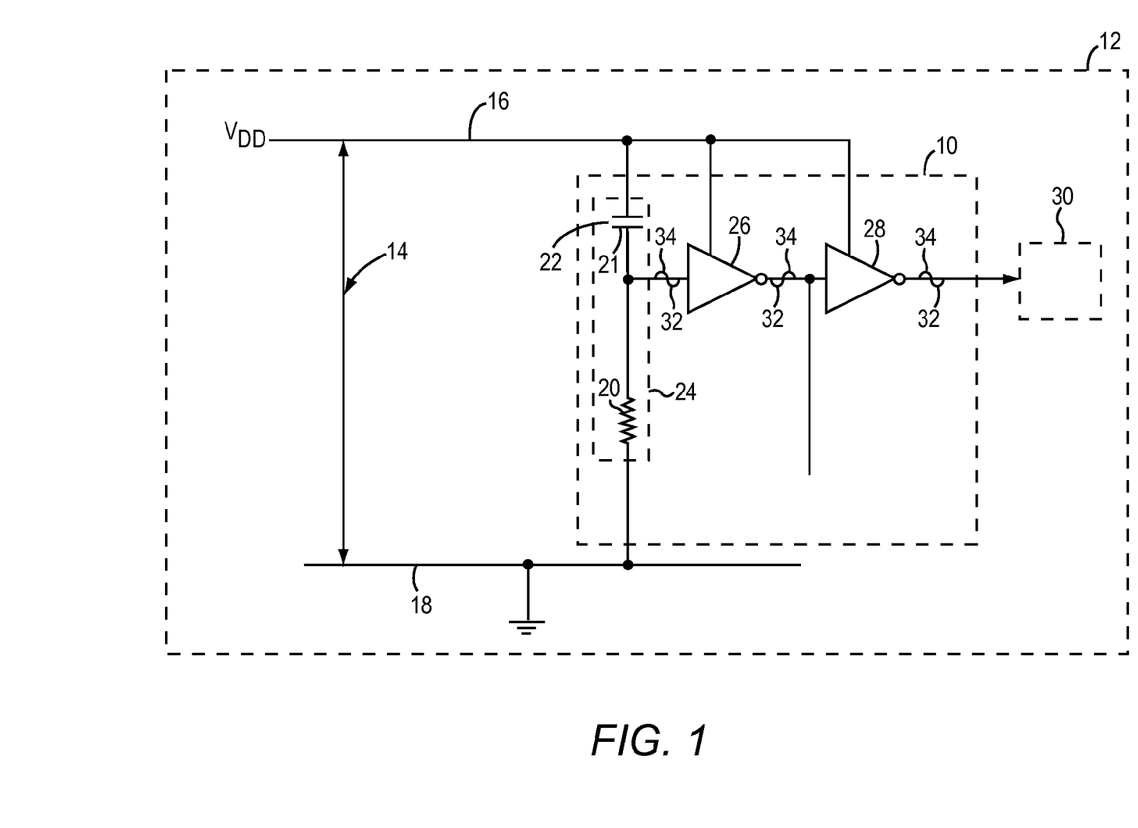
FIG. 1 is a schematic diagram of a conventional electrostatic discharge (ESD) detection circuit configured to detect an ESD event in an integrated circuit (IC) based on rising times of a voltage spike between a supply rail and a ground rail in the IC.

Before discussing ESD protection concepts of the present disclosure, a brief overview of a conventional approach for detecting an ESD event in an electronic circuit that may benefit from exemplary aspects of the present disclosure is provided with reference to FIG. 1. The discussion of specific exemplary aspects of ESD protection circuits starts below with reference to FIG. 2.

In this regard, FIG. 1 is a schematic diagram of a conventional ESD detection circuit 10 configured to detect an ESD event in an IC 12 based on rise time of a voltage spike 14 between a supply rail 16 and a ground rail 18.

With reference to FIG. 1, insulator surfaces (not shown) may rub together or pull apart during packaging of the IC 12. As a result, one surface may gain electrons, while another surface loses the electrons, thus creating an unbalanced electrical condition known as static charge. An ESD event occurs when the voltage spike 14 breaks down dielectric strength of the medium between the two surfaces. As a result, the static charge moves from one surface to another due to sufficiently high voltage differential between the two surfaces. When the static charge moves, it becomes an electrical current (not shown) that can damage or even destroy the IC 12. In addition, a voltage spike associated with the ESD event can exceed junction breakdown voltage of some active components (e.g., diode, transistor, etc.) in the IC 12, thus resulting in a junction breakdown in the active components. In this regard, the IC 12 must be protected from the voltage spike 14 during packaging. In a non-limiting example, the IC 12 is protected from ESD events that may occur between pins or be triggered when a single pin of the IC 12 touches a charged surface.

With continuing reference to FIG. 1, the conventional ESD detection circuit 10 comprises a resistor 20 and a capacitor 22 disposed in a serial arrangement. The resistor 20 and the capacitor 22 form a resistor-capacitor (RC) charging circuit 24. The RC charging circuit 24 is configured to feed a first inverter 26, which in turn feeds a second inverter 28 to activate an ESD clamping circuitry 30 when the voltage spike 14 occurs.

The conventional ESD detection circuit 10 is designed to activate or not activate the ESD clamping circuitry 30 based on detection of the voltage spike 14. When the voltage spike 14 does not occur in the IC 12 (e.g., a steady state), a bottom plate 31 of the capacitor 22 is at ground and feeds a logical LOW 32 to the first inverter 26. The first inverter 26 inverts the logical LOW 32 into a logical HIGH 34. The second inverter 28 receives and inverts the logical HIGH 34 back to the logical LOW 32, which keeps the ESD clamping circuitry 30 deactivated. When the voltage spike 14 occurs, the supply voltage of the first inverter 26 and the second inverter 28 follow the voltage spike 14. As a result, input voltage thresholds of the first inverter 26 and the second inverter 28 raise to the level of the voltage spike 14.

However, the ESD clamping circuitry 30 may be falsely activated when an operation voltage (e.g., $V_{DD}$) (not shown) is supplied to the IC 12 for a normal operation, thus causing the operation voltage to collapse. This is especially problematic if the operation voltage is supplied to the IC 12 from another control circuit (not shown) that cannot provide sufficient driving strength for the operation voltage. As a result, the IC 12 may take a prolonged period to reach the operation voltage or not be able to reach the operation voltage at all. Hence, it may be desirable to prevent the ESD clamping circuitry 30 from being falsely activated by the operation voltage by deterministically differentiating the operation voltage from the voltage spike 14 in the IC 12.

Figure 2:
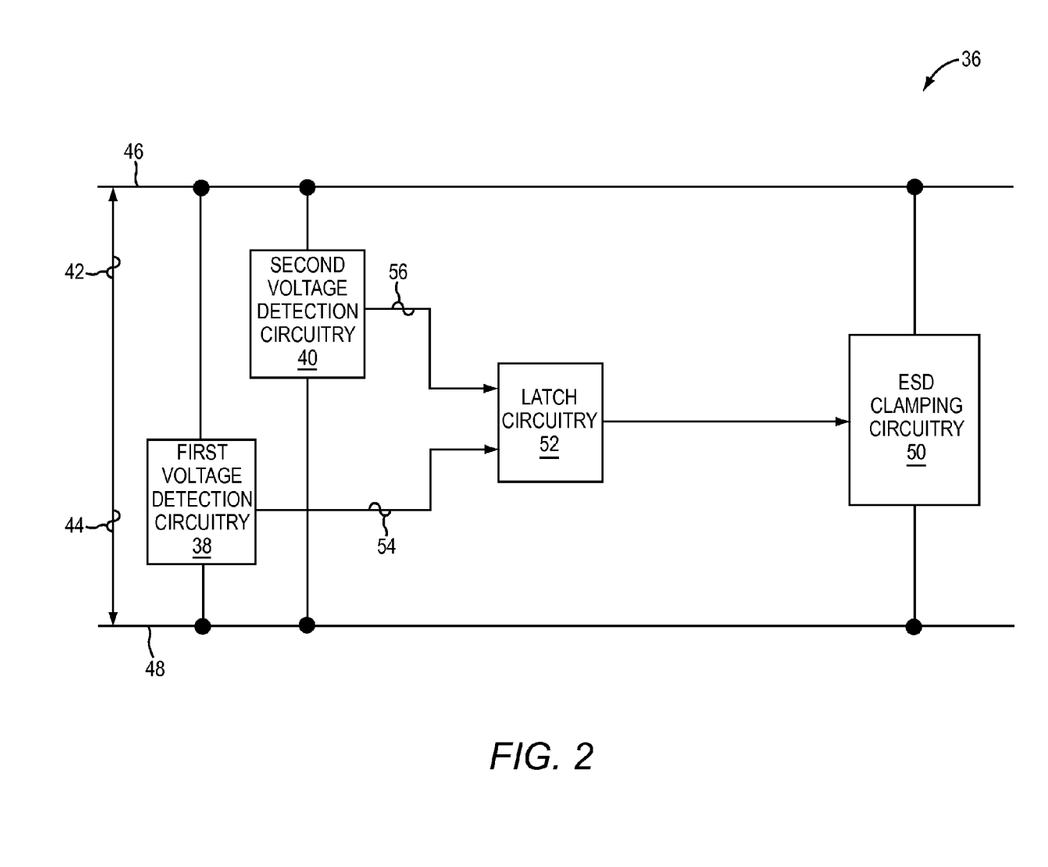
FIG. 2 is a schematic diagram of an exemplary ESD protection circuit utilizing a first voltage detection circuitry and a second voltage detection circuitry to differentiate an ESD voltage from an operation voltage based on respective voltage rise times.

In this regard, FIG. 2 is a schematic diagram of an exemplary ESD protection circuit 36 utilizing a first voltage detection circuitry 38 and a second voltage detection circuitry 40 to differentiate an ESD voltage 42 from a operation voltage 44 based on respective voltage rise times.

With reference to FIG. 2, the first voltage detection circuitry 38 and the second voltage detection circuitry 40 are coupled between a supply rail 46 and a ground rail 48. The first voltage detection circuitry 38 is configured to detect the ESD voltage 42 associated with a first rise time. In a first non-limiting example, the first rise time may be greater than or equal to two nanoseconds (2 ns) and less than or equal to fifteen nanoseconds (15 ns). In a second non-limiting example, the first rise time may also be greater than or equal to five nanoseconds (5 ns) and less than or equal to ten nanoseconds (10 ns).

The second voltage detection circuitry 40 is configured to detect the operation voltage 44 associated with a second rise time. In a non-limiting example, the second rise time may be greater than or equal to one half of a microsecond (0.5 μs) and less than or equal to four microseconds (4 μs). In another non-limiting example, the second rise time may be greater than or equal to one microsecond (1 μs) and less than or equal to one and a half microsecond (1.5 μs). Because the second rise time is significantly longer than the first rise time, it is possible to configure the first voltage detection circuitry 38 and the second voltage detection circuitry 40 to deterministically differentiate the ESD voltage 42 from the operation voltage 44 in the ESD protection circuit 36.

The ESD protection circuit 36 also comprises an ESD clamping circuitry 50 coupled between the supply rail 46 and the ground rail 48. The ESD clamping circuitry 50 is activated or deactivated by a latch circuitry 52. In a non-limiting example, the ESD clamping circuitry 50 may be an n-type metal-oxide semiconductor (nMOS) array, a p-type metal-oxide semiconductor (pMOS) array, a bipolar device, or a Darlington pair. When activated, the ESD clamping circuitry 50 discharges the ESD voltage 42 between the supply rail 46 and the ground rail 48. When deactivated, the ESD clamping circuitry 50 has no impact on the operation voltage 44.

The latch circuitry 52 is coupled to the first voltage detection circuitry 38 and the second voltage detection circuitry 40. The first voltage detection circuitry 38 generates a first detection signal 54 when the ESD voltage 42 is detected between the supply rail 46 and the ground rail 48 based on the first rise time. The first detection signal 54 causes the latch circuitry 52 to activate the ESD clamping circuitry 50 to discharge the ESD voltage 42. In contrast, the second voltage detection circuitry 40 generates a second detection signal 56 when the operation voltage 44 is detected between the supply rail 46 and the ground rail 48 based on the second rise time. The second detection signal 56 causes the latch circuitry 52 to deactivate the ESD clamping circuitry 50, thus preventing the ESD clamping circuitry 50 from collapsing the operation voltage 44. In addition, the second detection signal 56 is configured to deactivate the ESD clamping circuitry 50 after the ESD clamping circuitry 50 is activated by the first detection signal 54 to discharge the ESD voltage 42. By providing the first voltage detection circuitry 38 and the second voltage detection circuitry 40 in the ESD protection circuit 36, it is possible to deterministically differentiate the ESD voltage 42 from the operation voltage 44, thus providing protection against the ESD voltage 42 without impacting the operation voltage 44.

With continuing reference to FIG. 2, in a non-limiting example, the first voltage detection circuitry 38 and the second voltage detection circuitry 40 may be RC circuitries. In another non-limiting example, the latch circuitry 52 may be configured based on negative-and (NAND) logic or negative-or (NOR) logic. Some configurations of the ESD protection circuit 36 are illustrated and discussed next with reference to FIGS. 3-6.

Figure 3:
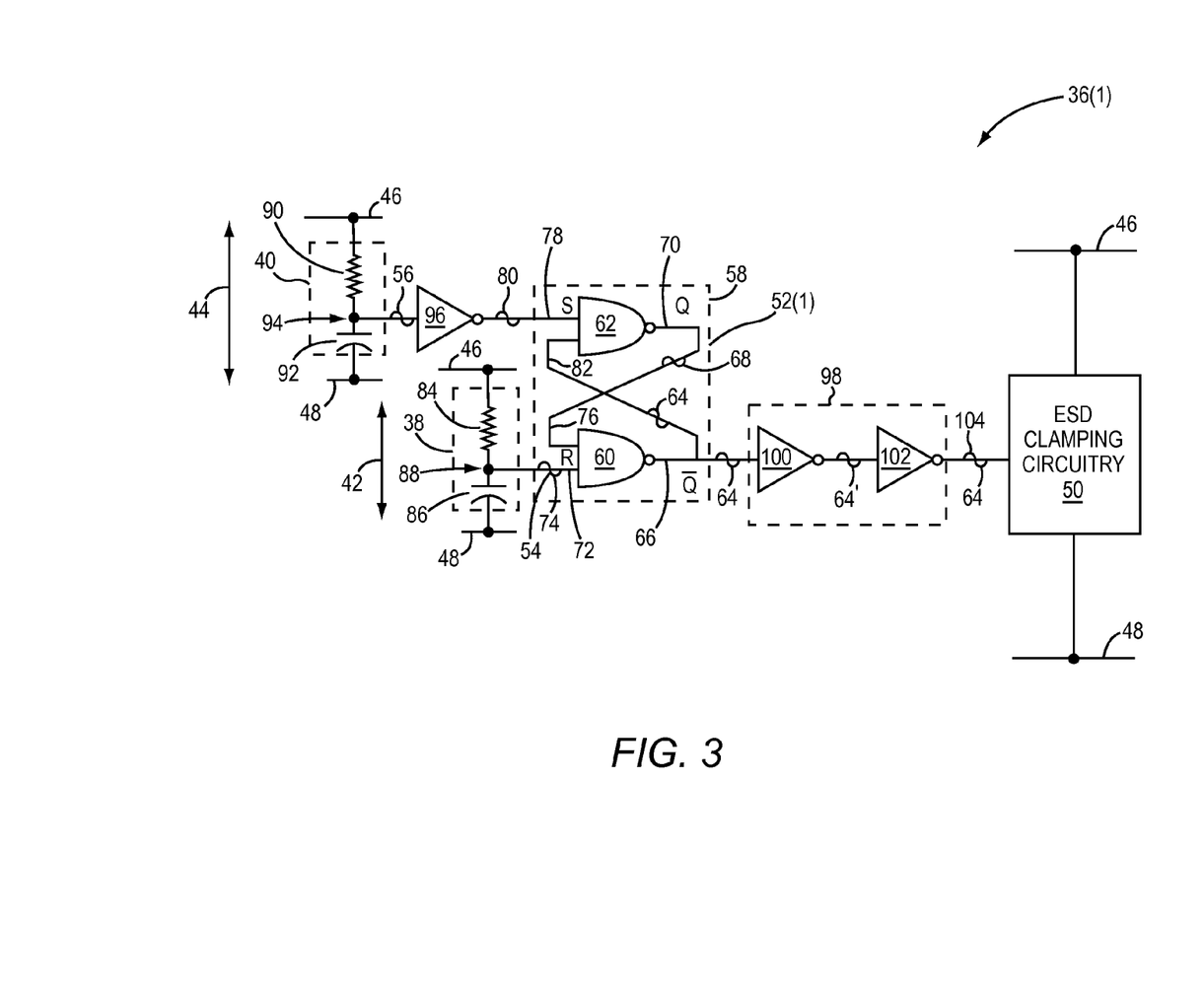
FIG. 3 is a schematic diagram of an exemplary ESD protection circuit including a latch circuitry configured based on a cross-coupled negative-and (NAND) logic.

In this regard, FIG. 3 is a schematic diagram of an exemplary ESD protection circuit 36(1) including a latch circuitry 52(1) configured based on a cross-coupled NAND logic 58. Common elements between FIGS. 2 and 3 are shown therein with common element numbers and will not be re-described herein.

With reference to FIG. 3, the cross-coupled NAND logic 58 comprises a first NAND gate 60 and a second NAND gate 62. In this regard, the cross-coupled NAND logic 58 may also be referred to as a cross-coupled NAND2 logic. The first NAND gate 60 outputs a first output signal ($\overline{Q}$ signal) 64 from a first output terminal ($\overline{Q}$ terminal) 66. The second NAND gate 62 outputs a second output signal (Q signal) 68 from a second output terminal (Q terminal) 70. The $\overline{Q}$ signal 64 is a complement of the Q signal 68. That is, when the Q signal 68 is logical one, the $\overline{Q}$ signal 64 is logical zero, and vise versa. The first NAND gate 60 has a reset terminal (R terminal) 72 configured to receive an R signal 74. The first NAND gate 60 also has a first input terminal 76 cross-coupled to the Q terminal 70 to receive the Q signal 68. The second NAND gate 62 has a set terminal (S terminal) 78 configured to receive an S signal 80. The second NAND gate 62 also has a second input terminal 82 cross-coupled to the $\overline{Q}$ terminal 66 to receive the $\overline{Q}$ signal 64.

The R signal 74 and the S signal 80 determine states of the $\overline{Q}$ signal 64 and the Q signal 68 based on the NAND logic truth table (Table 1) below.

TABLE 1

| S (80) | R (74) | Q (68) | $\overline{Q}$ (64) |
|---|---|---|---|
| 0 | 0 | Restricted | |
| 0 | 1 | 1 | 0 |
| 1 | 0 | 0 | 1 |
| 1 | 1 | Hold | |

According to Table 1, the $\overline{Q}$ signal 64 and the Q signal 68 are in a restricted state when the R signal 74 and the S signal 80 are both logical zeros. In this regard, the respective states of the $\overline{Q}$ signal 64 and the Q signal 68 may be non-deterministic and metastable. When the R signal 74 is logical one and the S signal 80 is logical zero, the $\overline{Q}$ signal 64 is logical zero and the Q signal 68 is logical one. When the R signal 74 is logical zero and the S signal 80 is logical one, the $\overline{Q}$ signal 64 is logical one and the Q signal 68 is logical zero. When the R signal 74 and the S signal 80 are both logical ones, the $\overline{Q}$ signal 64 and the Q signal 68 are in a hold state in which the $\overline{Q}$ signal 64 and the Q signal 68 both maintain the previous state. For example, if the R signal 74 is logical zero and the S signal 80 is logical one, the $\overline{Q}$ signal 64 will be logical one and the Q signal 68 will be logical zero according to Table 1. If the R signal 74 changes from logical zero to logical one and the S signal 80 maintains logical one, the $\overline{Q}$ signal 64 and the Q signal 68 will be held at logical one and logical zero, respectively.

With continuing reference to FIG. 3, the first voltage detection circuitry 38 comprises a resistor 84 and a capacitor 86 disposed in a serial arrangement. In a non-limiting example, the resistor 84 has a resistance of approximately ten kiloohms (10 KO) and the capacitor 86 has a capacitance of approximately five hundred femtofarad (500 fF). The capacitor 86 can be fully charged between 2 ns and 15 ns. The first voltage detection circuitry 38 is coupled to the R terminal 72 of the cross-coupled NAND logic 58 at a first connection point 88. In this regard, the first detection signal 54 is outputted at the first connection point 88. The second voltage detection circuitry 40 comprises a variable resistor 90 and a capacitor 92 disposed in a serial arrangement. In a non-limiting example, the variable resistor 90 may be a pMOS resistor having a variable resistance and the capacitor 92 may have a capacitance of approximately one picofarad (1 pF). The capacitor 92 can be fully charged between 0.5 μs and 4 μs. A second connection point 94 of the second voltage detection circuitry 40, which outputs the second detection signal 56, is coupled to the S terminal 78 of the cross-coupled NAND logic 58 through an inverter 96. In this regard, the first detection signal 54 is provided to the cross-coupled NAND logic 58 as the R signal 74. The second detection signal 56 is inverted by the inverter 96 before being provided to the cross-coupled NAND logic 58 as the S signal 80.

The $\overline{Q}$ terminal 66 of the cross-coupled NAND logic 58 is coupled to the ESD clamping circuitry 50 via an inversion logic 98. The inversion logic 98 comprises an even number of inverters disposed in a serial arrangement. In a non-limiting example, the inversion logic 98 comprises a first inverter 100 and a second inverter 102. The first inverter 100 receives and inverts the $\overline{Q}$ signal 64 to generate an inverted $\overline{Q}$ signal 64'. The second inverter 102 receives and inverts the inverted $\overline{Q}$ signal 64' again to generate a control signal 104 that activates or deactivates the ESD clamping circuitry 50. In a non-limiting example, the ESD clamping circuitry 50 is activated when the control signal 104 is logical one and deactivated when the control signal 104 is logical zero.

Before the ESD voltage 42 or the operation voltage 44 occurs between the supply rail 46 and the ground rail 48, the first connection point 88 and the second connection point 94 are both at logical LOWs. As such, both the first detection signal 54 and the second detection signal 56 are logical zeros.

When the ESD voltage 42 occurs between the supply rail 46 and the ground rail 48, the first detection signal 54 and the second detection signal 56 remain as logical zeros momentarily. As discussed above, the first detection signal 54 is provided to the cross-coupled NAND logic 58 as the R signal 74. The second detection signal 56 is inverted by the inverter 96 and then provided to the cross-coupled NAND logic 58 as the S signal 80. As such, the R signal 74 is logical zero and the S signal 80 is logical one. According to Table 1, the cross-coupled NAND logic 58 outputs the $\overline{Q}$ signal 64 as logical one. The $\overline{Q}$ signal 64 is inverted sequentially by the first inverter 100 and the second inverter 102 to generate the control signal 104 as logical one. Hence, the ESD clamping circuitry 50 is activated to discharge the ESD voltage 42.

After the first rise time associated with the ESD voltage 42, the capacitor 86 is charged, thus causing the first voltage detection circuitry 38 to generate the first detection signal 54 as logical one. Meanwhile, the second detection signal 56 remains as logical zero because the capacitor 92 in the second voltage detection circuitry 40 is not yet fully charged. As such, the R signal 74 and the S signal 80 are both logical ones. According to Table 1, the $\overline{Q}$ signal 64 is in the hold state and remains as logical one, thus keeping the ESD clamping circuitry 50 activated.

After the second rise time, which is significantly longer than the first rise time, the second voltage detection circuitry 40 generates the second detection signal 56 as logical one. The inverter 96 inverts the second detection signal 56 to generate the S signal 80 as logical zero. While the R signal 74 remains as logical one, the $\overline{Q}$ signal 64 is changed to logical zero according to Table 1. The first inverter 100 and the second inverter 102 invert the $\overline{Q}$ signal 64, sequentially, to generate the control signal 104 as logical zero. As a result, the ESD clamping circuitry 50 is deactivated.

With continuing reference to FIG. 3, when the operation voltage 44 is provided between the supply rail 46 and the ground rail 48, the first detection signal 54 and the second detection signal 56 turn into logical ones concurrently. Accordingly, the R signal 74 and the S signal 80 become logical one and logical zero, respectively. As a result, the cross-coupled NAND logic 58 outputs the $\overline{Q}$ signal 64 as logical zero according to Table 1. The first inverter 100 and the second inverter 102 invert the $\overline{Q}$ signal 64, sequentially, to generate the control signal 104 as logical zero, thus deactivating the ESD clamping circuitry 50.

Despite providing the R signal 74 as logical one and the S signal 80 as logical zero to the cross-coupled NAND logic 58, it is theoretically possible that the cross-coupled NAND logic 58 could still output the $\overline{Q}$ signal 64 as either logical one or logical zero, thus placing the ESD protection circuit 36(1) in a metastable state. However, it is possible to prevent the cross-coupled NAND logic 58 from causing the metastable state by implementing proper layout procedures in the ESD protection circuit 36(1). In a non-limiting example, it is possible to increase capacitance of the cross-coupled NAND logic 58 to ensure that the Q signal 68 is asserted before the $\overline{Q}$ signal 64. In another non-limiting example, it is also possible to couple the cross-coupled NAND logic 58 to a pull-down resistor (not shown) having an approximate resistance between twenty kiloohms (20 KΩ), inclusive, and one megaohm (1 MΩ), inclusive. This is especially effective in preventing the cross-coupled NAND logic 58 from causing the metastable state when the operation voltage 44 is weaker and slower to ramp up.

With continuing reference to FIG. 3, after the second rise time, the capacitor 92 in the second voltage detection circuitry 40 is charged, thus causing the second voltage detection circuitry 40 to generate the second detection signal 56 as logical zero. The inverter 96 inverts the second detection signal 56 to generate the S signal 80 as logical one. While the R signal 74 remains as logical one, the $\overline{Q}$ signal 64 is in the hold state and remains as logical zero according to Table 1. Thus, the ESD clamping circuitry 50 remains deactivated.

Figure 4:
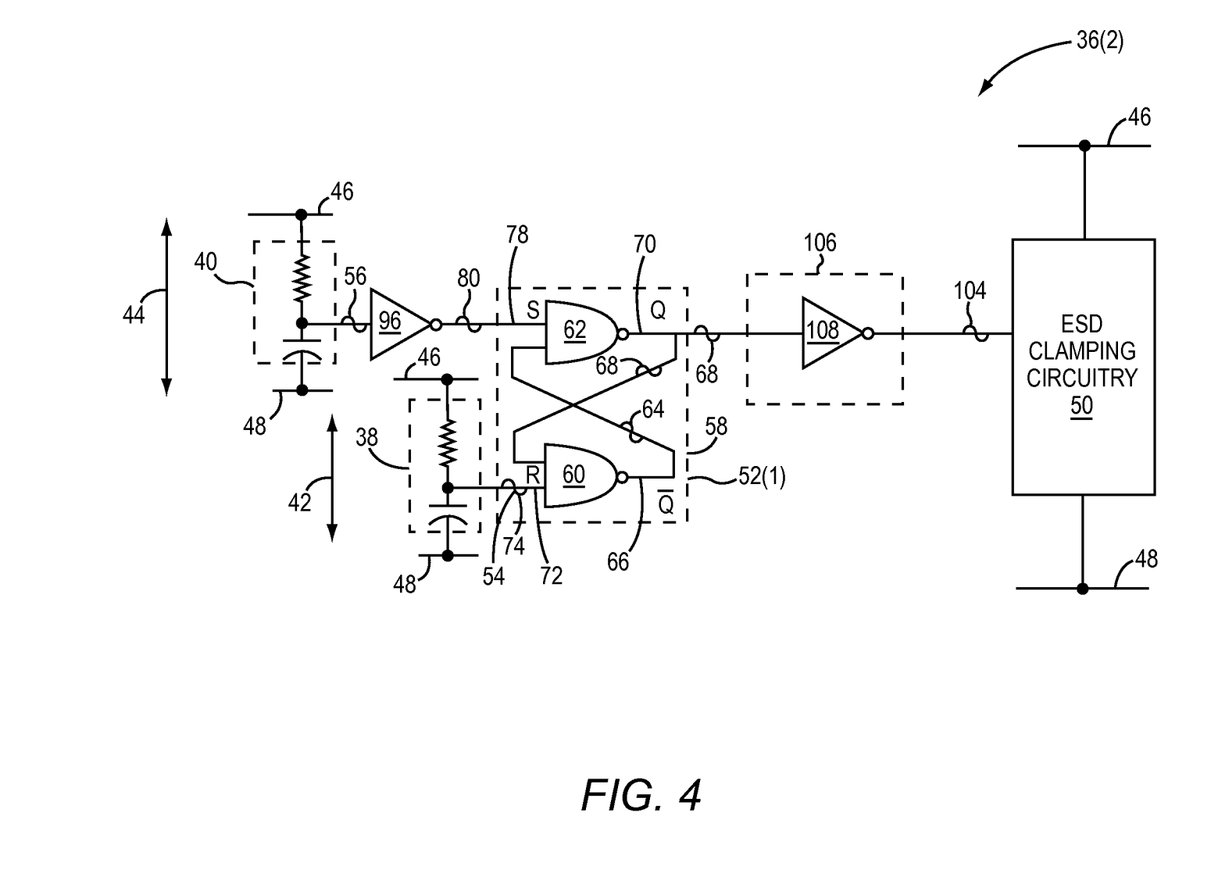
FIG. 4 is a schematic diagram of an exemplary ESD protection circuit including the latch circuitry of FIG. 3 according to an alternative configuration.

In contrast to activating or deactivating the ESD clamping circuitry 50 based on the $\overline{Q}$ signal 64, it is also possible to control the ESD clamping circuitry 50 via the Q signal 68. In this regard, FIG. 4 is a schematic diagram of an exemplary ESD protection circuit 36(2) including the latch circuitry 52(1) of FIG. 3 and configured to control the ESD clamping circuitry 50 via the Q signal 68. Common elements between FIGS. 3 and 4 are shown therein with common element numbers and will not be re-described herein.

With reference to FIG. 4, the Q terminal 70 of the cross-coupled NAND logic 58 in the latch circuitry 52(1) is coupled to the ESD clamping circuitry 50 via an inversion logic 106. The inversion logic 106 comprises odd number of inverters disposed in a serial arrangement. In a non-limiting example, the inversion logic 106 comprises an inverter 108 that receives and inverts the Q signal 68 to generate the control signal 104 to activate or deactivate the ESD clamping circuitry 50. In a non-limiting example, the ESD clamping circuitry 50 is activated when the control signal 104 is logical one and deactivated when the control signal 104 is logical zero.

When the ESD voltage 42 occurs between the supply rail 46 and the ground rail 48, the first detection signal 54 and the second detection signal 56 remain as logical zeros momentarily. As discussed above in FIG. 3, the first detection signal 54 is provided to the cross-coupled NAND logic 58 as the R signal 74. The second detection signal 56 is inverted by the inverter 96 and then provided to the cross-coupled NAND logic 58 as the S signal 80. As such, the R signal 74 is logical zero and the S signal 80 is logical one. According to Table 1, the cross-coupled NAND logic outputs the Q signal 68 as logical zero. After being inverted by the inverter 108, the control signal 104 becomes logical one, thus activating the ESD clamping circuitry 50 to discharge the ESD voltage 42.

After the first rise time associated with the ESD voltage 42, the capacitor 86 is charged, which causes the first voltage detection circuitry 38 to generate the first detection signal 54 as logical one. Meanwhile, the second detection signal 56 remains as logical zero because the capacitor 92 in the second voltage detection circuitry 40 is not yet fully charged. As such, the R signal 74 and the S signal 80 are both logical ones. According to Table 1, the Q signal 68 is in the hold state and the ESD clamping circuitry 50 remains activated.

After the second rise time, which is significantly longer than the first rise time, the second voltage detection circuitry 40 generates the second detection signal 56 as logical one. The inverter 96 inverts the second detection signal 56 to generate the S signal 80 as logical zero. While the R signal 74 remains as logical one, the Q signal 68 is turned into logical one according to Table 1. After being inverted by the inverter 108, the control signal 104 is turned into logical zero to deactivate the ESD clamping circuitry 50.

With continuing reference to FIG. 4, when the operation voltage 44 occurs between the supply rail 46 and the ground rail 48, the first detection signal 54 and the second detection signal 56 become logical ones concurrently. Accordingly, the R signal 74 and the S signal 80 become logical one and logical zero, respectively. According to Table 1, the cross-coupled NAND logic 58 outputs the Q signal 68 as logical one. After being inverted by the inverter 108, the control signal 104 becomes logical zero, thus keeping the ESD clamping circuitry 50 deactivated.

After the second rise time, the capacitor 92 in the second voltage detection circuitry 40 is charged, thus causing the second voltage detection circuitry 40 to generate the second detection signal 56 as logical zero. The inverter 96 inverts the second detection signal 56 to generate the S signal 80 as logical one. While the R signal 74 remains as logical one, the Q signal 68 is in the hold state and remains as logical zero according to Table 1. The ESD clamping circuitry 50 thus remains deactivated.

It is to be noted that FIGS. 3 and 4 are non-limiting illustrations of some possible configurations of the latch circuitry 52(1). It is also possible to provide latch circuitry 52(1) based on alternative configurations as shown in Table 2 below.

TABLE 2

| S Terminal (78) | R Terminal (72) | Q Terminal (70) | $\overline{Q}$ Terminal (66) |
|---|---|---|---|
| Coupled to the second voltage detection circuitry (40) | Coupled to the first voltage detection circuitry (38) via the inverter (96) | Not Applicable (N/A) | Coupled to the ESD clamping circuitry (50) via the inversion logic (106) |
| Coupled to the second voltage detection circuitry (40) | Coupled to the first voltage detection circuitry (38) via the inverter (96) | Coupled to the ESD clamping circuitry (50) via the inversion logic (98) | N/A |

Figure 5:
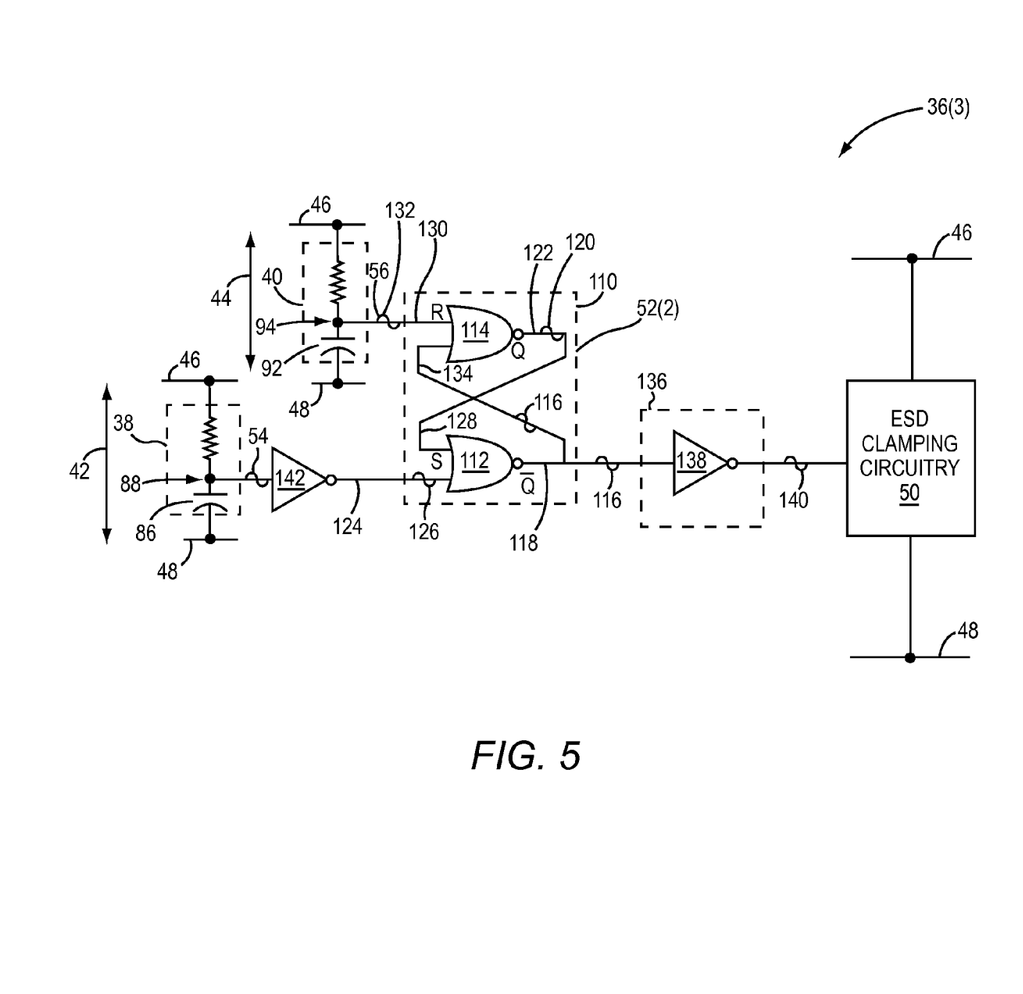
FIG. 5 is a schematic diagram of an exemplary ESD protection circuit including a latch circuitry configured based on a cross-coupled negative-or (NOR) logic.

Although the latch circuitry 52(1) in FIGS. 3 and 4 are shown to be based on the cross-coupled NAND logic 58, it is also possible to configure the latch circuitry 52 of FIG. 2 based on NOR logics. In this regard, FIG. 5 is a schematic diagram of an exemplary ESD protection circuit 36(3) including a latch circuitry 52(2) configured based on a cross-coupled NOR logic 110. Elements of FIGS. 2-4 are referenced in connection with FIG. 5 and will not be re-described herein.

With reference to FIG. 5, the cross-coupled NOR logic 110 comprises a first NOR gate 112 and a second NOR gate 114. As such, the cross-coupled NOR logic 110 may also be referred to as a cross-coupled NOR2 logic. The first NOR gate 112 outputs a $\overline{Q}$ signal 116 from a $\overline{Q}$ terminal 118. The second NOR gate 114 outputs a Q signal 120 from a Q terminal 122. The $\overline{Q}$ signal 116 is a complement of the Q signal 120. That is, when the Q signal 120 is logical one, the $\overline{Q}$ signal 116 is logical zero, and vise versa. The first NOR gate 112 has an S terminal 124 configured to receive an S signal 126. The first NOR gate 112 also has a first input terminal 128 cross-coupled to the Q terminal 122 to receive the Q signal 120. The second NOR gate 114 has an R terminal 130 configured to receive an R signal 132. The second NOR gate 114 also has a second input terminal 134 cross-coupled to the $\overline{Q}$ terminal 118 to receive the $\overline{Q}$ signal 116.

The S signal 126 and the R signal 132 determine states of the Q signal 116 and the Q signal 120 based on the NOR logic truth table (Table 3) below.

TABLE 3

| S (126) | R (132) | Q (120) | $\overline{Q}$ (116) |
|---|---|---|---|
| 1 | 1 | Restricted | |
| 0 | 1 | 0 | 1 |
| 1 | 0 | 1 | 0 |
| 0 | 0 | Hold | |

According to Table 3, the $\overline{Q}$ signal 116 and the Q signal 120 are in a restricted state when the S signal 126 and the R signal 132 are both logical ones. In this regard, the respective states of the $\overline{Q}$ signal 116 and the Q signal 120 may be non-deterministic and metastable. When the S signal 126 is logical zero and the R signal 132 is logical one, the $\overline{Q}$ signal 116 is logical one and the Q signal 120 is logical zero. When the S signal 126 is logical one and the R signal 132 is logical zero, the $\overline{Q}$ signal 116 is logical zero and the Q signal 120 is logical one. When the S signal 126 and the R signal 132 are both logical zeros, the $\overline{Q}$ signal 116 and the Q signal 120 are in a hold state in which the $\overline{Q}$ signal 116 and the Q signal 120 maintain respective previous states. For example, if the S signal 126 is logical zero and the R signal 132 is logical one, the $\overline{Q}$ signal 116 will be logical one and the Q signal 120 will be logical zero. If the R signal 132 changes from logical one to logical zero and the S signal 126 remains as logical zero, the $\overline{Q}$ signal 116 and the Q signal 120 will be held at logical one and logical zero, respectively.

With continuing reference to FIG. 5, the $\overline{Q}$ terminal 118 of the cross-coupled NOR logic 110 is coupled to the ESD clamping circuitry 50 via an inversion logic 136. The inversion logic 136 comprises an odd number of inverters disposed in a serial arrangement. In a non-limiting example, the inversion logic 136 comprises an inverter 138 configured to receive and invert the $\overline{Q}$ signal 116 to generate a control signal 140 that activates or deactivates the ESD clamping circuitry 50. In a non-limiting example, the ESD clamping circuitry 50 is activated when the control signal 140 is logical one and deactivated when the control signal 140 is logical zero.

As previously discussed in FIG. 3, before the ESD voltage 42 or the operation voltage 44 occurs between the supply rail 46 and the ground rail 48, the first connection point 88 and the second connection point 94 are both at logical LOWs. As such, both the first detection signal 54 and the second detection signal 56 are logical zeros.

When the ESD voltage 42 occurs between the supply rail 46 and the ground rail 48, the first detection signal 54 and the second detection signal 56 remain as logical zeros momentarily. The second detection signal 56 is provided to the cross-coupled NOR logic 110 as the R signal 132. The first detection signal 54 is inverted by an inverter 142 and then provided to the cross-coupled NOR logic 110 as the S signal 126. As such, the S signal 126 is logical one and the R signal 132 is logical zero. According to Table 3, the cross-coupled NOR logic 110 outputs the $\overline{Q}$ signal 116 as logical zero. The inverter 138 inverts the $\overline{Q}$ signal 116 to generate the control signal 140 as logical one, thus activating the ESD clamping circuitry 50 to discharge the ESD voltage 42.

After the first rise time associated with the ESD voltage 42, the capacitor 86 is charged, which causes the first voltage detection circuitry 38 to generate the first detection signal 54 as logical one. Meanwhile, the second detection signal 56 remains as logical zero because the capacitor 92 in the second voltage detection circuitry 40 is not yet fully charged. Consequently, the S signal 126 and the R signal 132 are both logical zeros. According to Table 3, the $\overline{Q}$ signal 116 is in the hold state and remains as logical zero. In this regard, the control signal 140 remains as logical one to keep the ESD clamping circuitry 50 activated.

After the second rise time, which is significantly longer than the first rise time, the second voltage detection circuitry 40 generates the second detection signal 56, and thus the R signal 132, as logical one. With the S signal remaining as logical zero, the $\overline{Q}$ signal 116 changes to logical one according to Table 3. The inverter 138 inverts the $\overline{Q}$ signal 116 to generate the control signal 140 as logical zero, thus deactivating the ESD clamping circuitry 50.

With continuing reference to FIG. 5, when the operation voltage 44 is applied between the supply rail 46 and the ground rail 48, the first detection signal 54 and the second detection signal 56 become logical ones concurrently. The S signal 126 and the R signal 132 thus become logical zero and logical one, respectively. According to Table 3, the cross-coupled NOR logic 110 outputs the $\overline{Q}$ signal 116 as logical one. The inverter 138 inverts the $\overline{Q}$ signal 116 to generate the control signal 140 as logical zero to deactivate the ESD clamping circuitry 50.

After the second rise time, the capacitor 92 in the second voltage detection circuitry 40 is charged, thus causing the second voltage detection circuitry 40 to generate the second detection signal 56 as logical zero. With the R signal 132 remaining as logical zero, the $\overline{Q}$ signal 116 is in the hold state and remains as logical one according to Table 3. The ESD clamping circuitry 50 thus remains deactivated.

Figure 6:
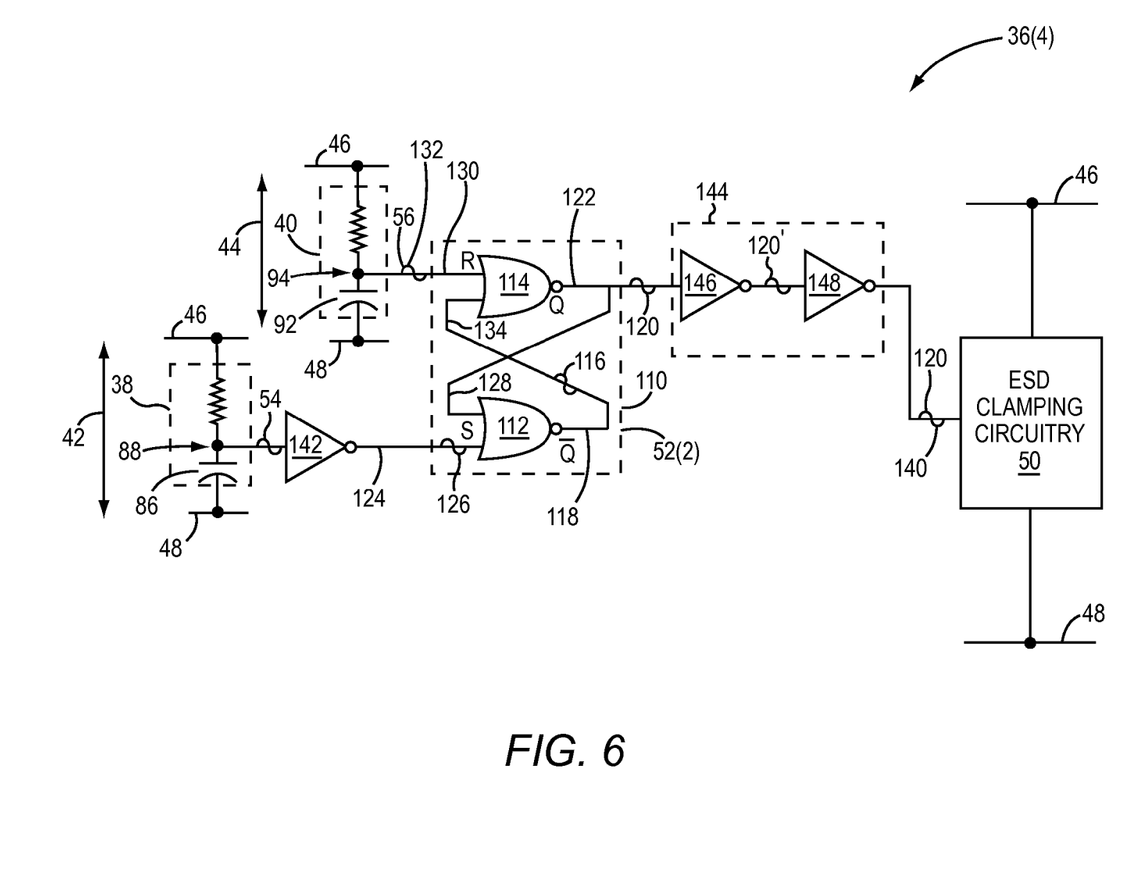
FIG. 6 is a schematic diagram of an exemplary ESD protection circuit including the latch circuitry of FIG. 5 according to an alternative configuration.

In contrast to activating or deactivating the ESD clamping circuitry 50 based on the $\overline{Q}$ signal 116, it is also possible to control the ESD clamping circuitry 50 via the Q signal 120. In this regard, FIG. 6 is a schematic diagram of an exemplary ESD protection circuit 36(4) including the latch circuitry 52(2) of FIG. 5 and configured to control the ESD clamping circuitry 50 via the Q signal 120. Common elements between FIGS. 5 and 6 are shown therein with common element numbers and will not be re-described herein.

With reference to FIG. 6, the Q terminal 122 of the cross-coupled NOR logic 110 in the latch circuitry 52(2) is coupled to the ESD clamping circuitry 50 via an inversion logic 144. The inversion logic 144 comprises an even number of inverters disposed in a serial arrangement. In a non-limiting example, the inversion logic 144 comprises a first inverter 146 and a second inverter 148. The first inverter 146 receives and inverts the Q signal 120 to generate an inverted Q signal 120'. The second inverter 148 receives and inverts the inverted Q signal 120' to generate the control signal 140 that activates or deactivates the ESD clamping circuitry 50. In a non-limiting example, the ESD clamping circuitry 50 is activated when the control signal 140 is logical one and deactivated when the control signal 140 is logical zero.

When the ESD voltage 42 occurs between the supply rail 46 and the ground rail 48, the first detection signal 54 and the second detection signal 56 remain as logical zeros momentarily. The second detection signal 56 is provided to the cross-coupled NOR logic 110 as the R signal 132. The first detection signal 54 is inverted by the inverter 142 and then provided to the cross-coupled NOR logic 110 as the S signal 126. As such, the S signal 126 is logical one and the R signal 132 is logical zero when the ESD voltage 42 occurs. According to Table 3, the cross-coupled NOR logic 110 outputs the Q signal 120 as logical one. The first inverter 146 and the second inverter 148 invert the Q signal 120, sequentially, to generate the control signal 140 as logical one, thus activating the ESD clamping circuitry 50 to discharge the ESD voltage 42.

After the first rise time associated with the ESD voltage 42, the capacitor 86 is charged, thus causing the first voltage detection circuitry 38 to generate the first detection signal 54 as logical one. Meanwhile, the second detection signal 56 remains as logical zero because the capacitor 92 in the second voltage detection circuitry 40 is not yet fully charged. As such, the S signal 126 changes to logical zero while the R signal 132 remains logical zero. According to Table 3, the Q signal 120 is in the hold state and remains as logical one. The ESD clamping circuitry 50 thus remains activated.

After the second rise time, which is significantly longer than the first rise time, the second voltage detection circuitry 40 generates the second detection signal 56, and thus the R signal 132, as logical one. With the S signal 126 remaining logical zero, the Q signal 120 changes to logical zero according to Table 3. After being inverted by the first inverter 146 and the second inverter 148 sequentially, the control signal 140 becomes logical zero. Hence, the ESD clamping circuitry 50 is deactivated.

With continuing reference to FIG. 6, when the operation voltage 44 occurs between the supply rail 46 and the ground rail 48, the first detection signal 54 and the second detection signal 56 become logical ones concurrently. The R signal 132 and the S signal thus become logical one and logical zero, respectively. According to Table 3, the cross-coupled NOR logic 110 outputs the Q signal 120 as logical zero. After being inverted by the first inverter 146 and the second inverter 148 sequentially, the control signal 140 becomes logical zero to keep the ESD clamping circuitry 50 deactivated.

After the second rise time, the capacitor 92 in the second voltage detection circuitry 40 is charged, thus causing the second voltage detection circuitry 40 to generate the second detection signal 56, and thus the R signal 132, as logical zero. With the R signal 126 remaining as logical zero, the Q signal 120 is in the hold state and remains as logical zero according to Table 3. The ESD clamping circuitry 50 thus remains deactivated.

It is to be noted that FIGS. 5 and 6 are non-limiting illustrations of possible configurations of the latch circuitry 52(2). It is also possible to provide latch circuitry 52(2) based on alternative configurations as shown in Table 4 below.

TABLE 4

| S Terminal (124) | R Terminal (130) | Q Terminal (122) | $\overline{Q}$ Terminal (118) |
| --- | --- | --- | --- |
| Coupled to the first voltage detection circuitry (38) | Coupled to the second voltage detection circuitry (40) via the inverter (142) | N/A | Coupled to the ESD clamping circuitry (50) via the inversion logic (144) |
| Coupled to the first voltage detection | Coupled to the second voltage detection | Coupled to the ESD clamping circuitry (50) | N/A |

TABLE 4-continued

| S Terminal (124) | R Terminal (130) | Q Terminal (122) | Q̄ Terminal (118) |
|---|---|---|---|
| circuitry (38) | circuitry (40) via the inverter (142) | via the inversion logic (136) | |

Figure 7:
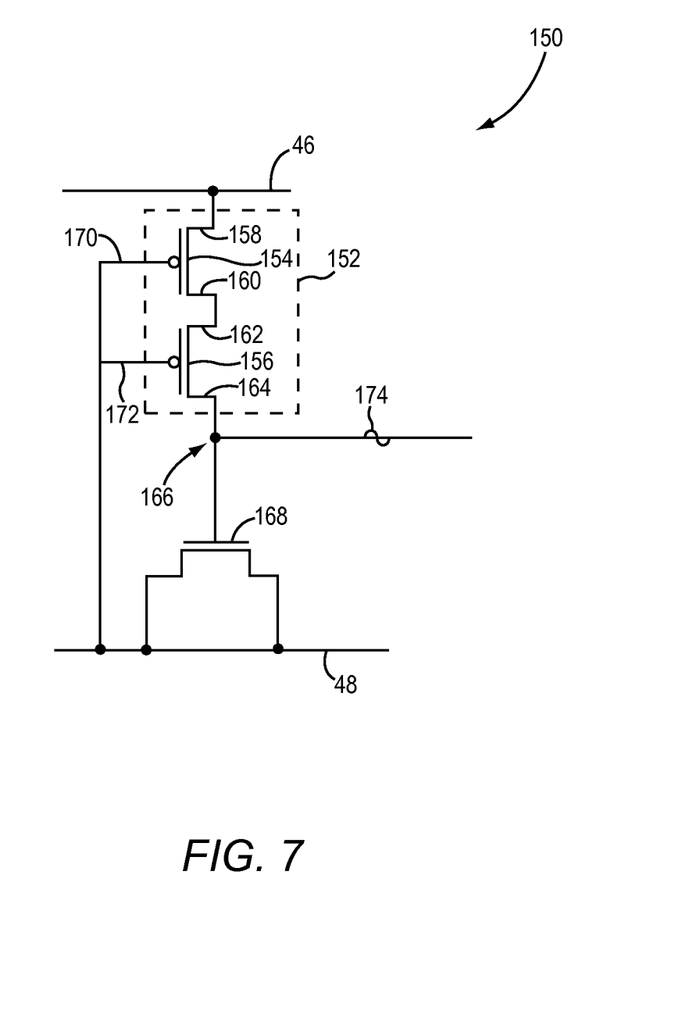
FIG. 7 is a schematic diagram of an exemplary voltage detection circuitry including a variable resistor provided based on a p-type metal-oxide semiconductor (pMOS) resistor.

As previously discussed in FIG. 3, the variable resistor 90 in the second voltage detection circuitry 40 may be a pMOS resistor. In this regard, FIG. 7 is a schematic diagram of an exemplary voltage detection circuitry 150 including a pMOS resistor 152 configured to function as a variable resistor. Elements of FIGS. 3-6 are referenced in connection with FIG. 7 and will not be re-described herein.

In a non-limiting example, the pMOS resistor 152 may be configured to function as the variable resistor 90 in the second voltage detection circuitry 40. The pMOS resistor 152 comprises a first pMOS transistor 154 and a second pMOS transistor 156 disposed in a serial arrangement. In another non-limiting example, the first pMOS transistor 154 and the second pMOS transistor 156 may have respective lengths of twenty-one and a half micrometers (21.5 μm) and respective widths of five hundred nanometers (500 nm). The first pMOS transistor 154 has a drain electrode 158 coupled to the supply rail 46. A source electrode 160 of the first pMOS transistor 154 is coupled to a drain electrode 162 of the second pMOS transistor 156. A source electrode 164 of the second pMOS transistor 156 is coupled to a connection point 166, which is further coupled to a capacitor 168. A gate electrode 170 of the first pMOS transistor 154 and a gate electrode 172 of the second pMOS transistor 156 are both coupled to the ground rail 48.

The voltage detection circuitry 150 outputs a detection signal 174 from the connection point 166. In a non-limiting example the detection signal 174 may be the second detection signal 56 outputted by the second voltage detection circuitry 40 in FIGS. 3-6.

Those skilled in the art will recognize improvements and modifications to the embodiments of the present disclosure. All such improvements and modifications are considered within the scope of the concepts disclosed herein and the claims that follow.

What is claimed is:

1. An electrostatic discharge (ESD) protection circuit in an integrated circuit (IC) comprising:
   an ESD clamping circuitry coupled between a supply rail and a ground rail and configured to discharge an ESD event in an IC;
   first voltage detection circuitry coupled between the supply rail and the ground rail and configured to generate a first detection signal when an ESD voltage having a first rise time is detected between the supply rail and the ground rail;
   second voltage detection circuitry coupled between the supply rail and the ground rail and configured to generate a second detection signal when an operation voltage, which has a second rise time that is greater than fifty times the first rise time, is detected between the supply rail and the ground rail; and
   latch circuitry coupled to the first voltage detection circuitry and the second voltage detection circuitry, the latch circuitry configured to:
   activate the ESD clamping circuitry to discharge the ESD event in response to the first detection signal independent of the second detection signal; and
   deactivate the ESD clamping circuitry in response to the second detection signal.

2. The ESD protection circuit of claim 1 wherein the first voltage detection circuitry is further configured to generate the first detection signal as logical zero in response to detecting the ESD voltage and wherein the first rise time is greater than or equal to two nanoseconds (2 ns) and less than or equal to fifteen nanoseconds (15 ns).

3. The ESD protection circuit of claim 1 wherein the first voltage detection circuitry is further configured to generate the first detection signal as logical zero in response to detecting the ESD voltage and wherein the first rise time is greater than or equal to five nanoseconds (5 ns) and less than or equal to ten nanoseconds (10 ns).

4. The ESD protection circuit of claim 1 wherein the second voltage detection circuitry is further configured to generate the second detection signal as logical one in response to detecting the operation voltage and wherein the second rise time is greater than or equal to one half of a microsecond (0.5 μs) and less than or equal to four microseconds (4 μs).

5. The ESD protection circuit of claim 1 wherein the second voltage detection circuitry is further configured to generate the second detection signal as logical one in response to detecting the operation voltage and wherein the second rise time is greater than or equal to one millisecond (1 ms) and less than or equal to one and a half milliseconds (1.5 ms).

6. The ESD protection circuit of claim 1 wherein the first voltage detection circuitry comprises:
   a resistor and a capacitor disposed in a serial arrangement;
   the resistor having a resistance of approximately ten kiloohms (10 KΩ); and
   the capacitor having a capacitance of approximately five hundred femtofarad (500 fF) and configured to be fully charged between two nanosecond (2 ns) and fifteen nanoseconds (15 ns).

7. The ESD protection circuit of claim 1 wherein the second voltage detection circuitry comprises:
   a p-type metal-oxide semiconductor (pMOS) resistor and a capacitor disposed in a serial arrangement;
   the pMOS resistor having a variable resistance; and
   the capacitor having a capacitance of approximately one picofarad (1 pF) and configured to be fully charged between one half of a microsecond (0.5 μs) and four microseconds (4 μs).

8. The ESD protection circuit of claim 1 wherein the ESD clamping circuitry further comprises a device selected from the group consisting of: an n-type metal-oxide semiconductor (nMOS) array; a p-type metal-oxide semiconductor (pMOS) array; a bipolar device; and a Darlington pair.

9. The ESD protection circuit of claim 1 wherein the latch circuitry comprises a cross-coupled negative-and (NAND) logic comprising:
   a reset terminal (R terminal) coupled to the first voltage detection circuitry to receive the first detection signal as an R signal;
   a set terminal (S terminal) coupled to the second voltage detection circuitry via an inverter, the inverter configured to invert the second detection signal and provide the inverted second detection signal to the S terminal as an S signal; and
   an output terminal (Q̄ terminal) coupled to the ESD clamping circuitry via an inversion logic, the inversion logic configured to convert a Q̄ signal outputted by the Q̄ terminal into a control signal to activate or deactivate the ESD clamping circuitry.

10. The ESD protection circuit of claim 9 wherein the inversion logic comprises an even number of inverters disposed in a serial arrangement.

11. The ESD protection circuit of claim 10 wherein the latch circuitry is further configured to:
  generate the $\overline{Q}$ signal as logical one to activate the ESD clamping circuitry in response to receiving the R signal as logical zero and the S signal as logical one; and
  generate the $\overline{Q}$ signal as logical zero to deactivate the ESD clamping circuitry in response to receiving the R signal as logical one and the S signal as logical zero.

12. The ESD protection circuit of claim 1 wherein the latch circuitry comprises a cross-coupled negative-and (NAND) logic comprising:
  a reset terminal (R terminal) coupled to the first voltage detection circuitry to receive the first detection signal as an R signal;
  a set terminal (S terminal) coupled to the second voltage detection circuitry via an inverter, the inverter configured to invert the second detection signal and provide the inverted second detection signal to the S terminal as an S signal; and
  an output terminal (Q terminal) coupled to the ESD clamping circuitry via an inversion logic, the inversion logic configured to convert a Q signal outputted by the Q terminal into a control signal to activate or deactivate the ESD clamping circuitry.

13. The ESD protection circuit of claim 12 wherein the inversion logic comprises an odd number of inverters disposed in a serial arrangement.

14. The ESD protection circuit of claim 13 wherein the latch circuitry is further configured to:
  generate the Q signal as logical one to activate the ESD clamping circuitry in response to receiving the R signal as logical zero and the S signal as logical one; and
  generate the Q signal as logical zero to deactivate the ESD clamping circuitry in response to receiving the R signal as logical one and the S signal as logical zero.

15. The ESD protection circuit of claim 1 wherein the latch circuitry comprises a cross-coupled negative-or (NOR) logic comprising:
  a set terminal (S terminal) coupled to the first voltage detection circuitry via an inverter, the inverter configured to invert the first detection signal and provide the inverted first detection signal to the S terminal as an S signal;
  a reset terminal (R terminal) coupled to the second voltage detection circuitry to receive the second detection signal as an R signal; and
  an output terminal ($\overline{Q}$ terminal) coupled to the ESD clamping circuitry via an inversion logic, the inversion logic configured to convert a $\overline{Q}$ signal outputted by the $\overline{Q}$ terminal into a control signal to activate or deactivate the ESD clamping circuitry.

16. The ESD protection circuit of claim 15 wherein the inversion logic comprises an odd number of inverters disposed in a serial arrangement.

17. The ESD protection circuit of claim 16 wherein the latch circuitry is further configured to:
  generate the $\overline{Q}$ signal as logical zero to activate the ESD clamping circuitry in response to receiving the S signal as logical one and the R signal as logical zero; and
  generate the $\overline{Q}$ signal as logical one to deactivate the ESD clamping circuitry in response to receiving the S signal as logical zero and the R signal as logical one.

18. The ESD protection circuit of claim 1 wherein the latch circuitry comprises a cross-coupled negative-or (NOR) logic comprising:
  a set terminal (S terminal) coupled to the first voltage detection circuitry via an inverter, the inverter configured to invert the first detection signal and provide the inverted first detection signal to the S terminal as an S signal;
  a reset terminal (R terminal) coupled to the second voltage detection circuitry to receive the second detection signal as an R signal; and
  an output terminal (Q terminal) coupled to the ESD clamping circuitry via an inversion logic, the inversion logic configured to convert a Q signal outputted by the Q terminal into a control signal to activate or deactivate the ESD clamping circuitry.

19. The ESD protection circuit of claim 18 wherein the inversion logic comprises an even number of inverters disposed in a serial arrangement.

20. The ESD protection circuit of claim 19 wherein the latch circuitry is further configured to:
  generate the Q signal as logical one to activate the ESD clamping circuitry in response to receiving the S signal as logical one and the R signal as logical zero; and
  generate the Q signal as logical zero to deactivate the ESD clamping circuitry in response to receiving the S signal as logical zero and the R signal as logical one.

* * * * *

UNITED STATES PATENT AND TRADEMARK OFFICE
CERTIFICATE OF CORRECTION

PATENT NO. : 9,972,999 B2
APPLICATION NO. : 14/819507
DATED : May 15, 2018
INVENTOR(S) : Nathaniel Peachey

Page 1 of 1

It is certified that error appears in the above-identified patent and that said Letters Patent is hereby corrected as shown below:

In the Specification

In Column 6, Line 33, replace "kiloohms (10 KO)" with --kiloohms (10 KΩ)--.

Signed and Sealed this
Twenty-fourth Day of July, 2018

Andrei Iancu
*Director of the United States Patent and Trademark Office*